United States Patent [19]

Kivistö et al.

[11] Patent Number: 4,566,968

[45] Date of Patent: Jan. 28, 1986

[54] APPARATUS FOR LEADING OFF FROTH FROM THE TANK OF A FLOTATION CELL

[75] Inventors: Tuomo V. J. Kivistö, Outokumpu; Kai B. Fallenius; Timo U. Niitti, both of Espoo, all of Finland

[73] Assignee: Outokumpu Oy, Helsinki, Finland

[21] Appl. No.: 671,801

[22] Filed: Nov. 15, 1984

Related U.S. Application Data

[63] Continuation of Ser. No. 545,616, Oct. 26, 1983, abandoned.

[30] Foreign Application Priority Data

Nov. 16, 1982 [FI] Finland .................................. 823919

[51] Int. Cl.[4] .............................................. B01D 21/24

[52] U.S. Cl. .................................. 210/221.1; 210/540

[58] Field of Search .................. 210/221.1, 221.2, 540, 210/776

[56] References Cited

U.S. PATENT DOCUMENTS

| | | | |
|---|---|---|---|
| 3,794,171 | 2/1974 | Kimura et al. | 210/221.2 |
| 3,828,935 | 8/1974 | Rovel | 210/540 X |
| 3,935,103 | 1/1976 | Disque et al. | 210/776 X |
| 4,043,912 | 8/1977 | Bascope et al. | 210/776 |
| 4,082,671 | 4/1978 | Kelly | 210/221.2 X |

*Primary Examiner*—Thomas Wyse
*Attorney, Agent, or Firm*—John Smith-Hill

[57] ABSTRACT

An apparatus for leading off from a flotation cell tank in froth that is produced is composed of at least two launders (3) positioned inside the tank (1), their points of support being located close to the tank wall, and of a drain pipe (10) connected to the tubular lower part (9) of the launder.

10 Claims, 2 Drawing Figures

APPARATUS FOR LEADING OFF FROTH FROM THE TANK OF A FLOTATION CELL

Figure 1:
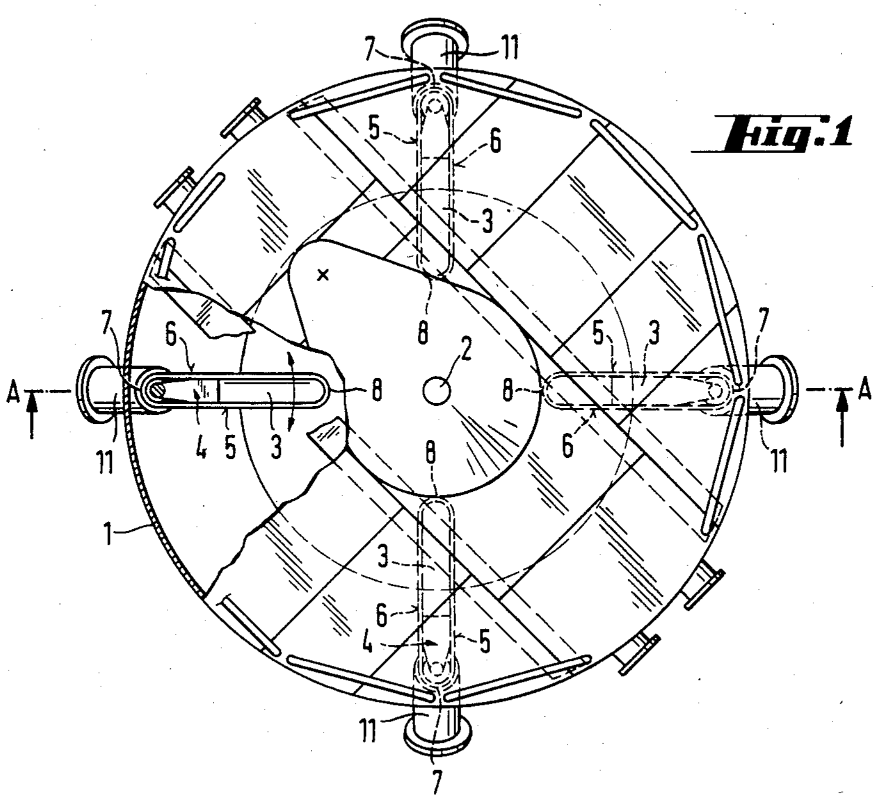

This is a continuation of application Ser. No. 545,616 filed Oct. 26, 1983 and now abandoned.

This invention relates to apparatus for leading off the froth that has formed in the tank of a flotation cell.

The term "flotation cell" used in this text refers to a unit consisting of a flotation mechanism, launders and a tank. A flotation machine is understood to be an integral unit composed of one, or mostly several flotation cells.

In the course of the development of the flotation machine, ever larger tanks have been used. Large tanks also require, regarding the rest of the apparatus, specific designs appropriate for said purposes. The tanks of a flotation machine most common in current use are rectangular in cross-section, and the froth produced in them is usually removed therefrom in overflow on two sides of the basin into launders located outside the tank. In the case of a large tank, a design of this kind requires much space and, in addition, the time delay as the foam passes to the sides is substantial. When a tank with circular cross-section is concerned, the construction of an outside launder becomes a costly and space-consuming design.

The flotation means of the German patent application No. 2906599 is known in the art, in which the tank of the flotation cell has substantially circular cross-section and on the vertical axis of the cell is placed a launder tube encircling the drive shaft of the mixer. The froth draining tube extends inside the cell past its halfway height, and the tube is provided in its lower part with a plurality of apertures which are located in the wall of the tube and through which the froth is drawn into the tube.

In the design of the present invention, the froth is removed from the flotation cell with the aid of launders located inside the tank, and having their points of support close to the outer rim of the tank. The number of launders may vary, but advantageously it is 2–10. When launders of this kind are being used, the distance travelled by the froth is relatively short. In the case of large tanks, launders situated inside are less costly than those situated outside.

The object of the present invention is to eliminate the drawbacks which in particular in the case of large flotation cell tanks are caused by launders situated outside of the tank.

By the aid of the launders of the invention inside the tank, froth separation is carried out in the top part of the tank, in the form of overflow from the surface of the froth. The launders are so positioned that their points of support are close to the outer rim of the tank and the launders can be horizontally turned if required. The cross-sectional area of a froth collecting launder is at its maximum in the top part of the launder, and the launder, which is tubular at its lower part, is connected to a drain pipe. The essential characteristic features of the invention are presented in claim 1.

Figure 2:
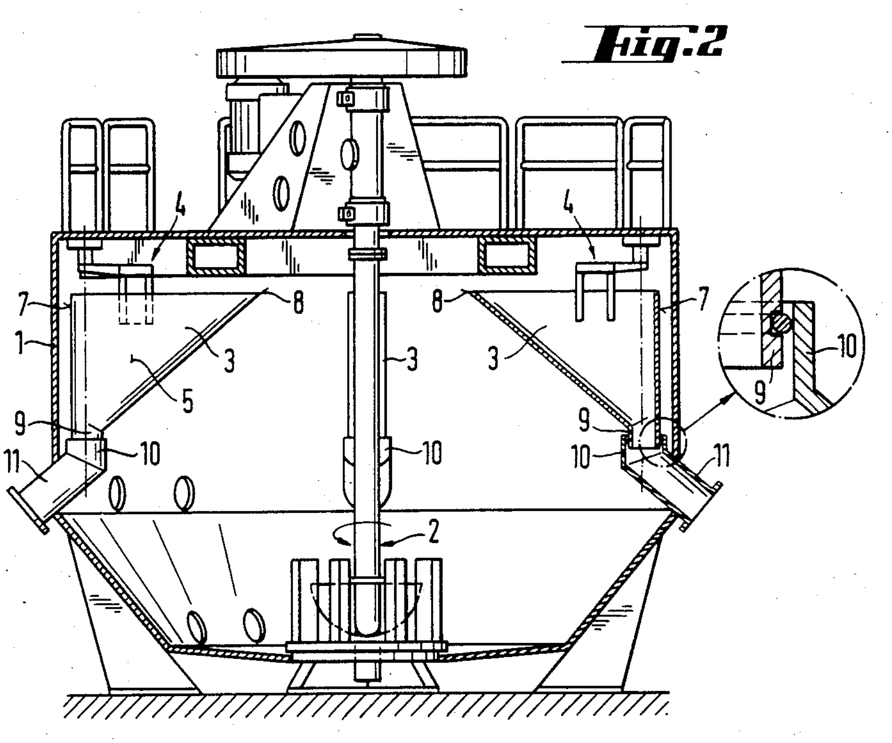

The invention is described more in detail by the aid of the figures attached, wherein:

FIG. 1 presents in top view a substantially circular tank of a flotation cell and the launders of the invention therewithin, and FIG. 2 is the section A—A of the cell tank of FIG. 1 and of the launders placed therein.

In FIG. 1 is shown the tank 1 of the flotation cell and the flotation mechanism 2 with drive shaft in its centre. The launders 3 inside the tank are in their upper part carried on the wall of the tank by the aid of a supporting structure 4 carried rotatably and adjustable from above and lockable. The attachment of the launder may also be fixed. The long sides 5 and 6 of the launders 3, radial in their basic position, are according to the present design substantially straight, while the ends 7 and 8 are curved.

In FIG. 2 it is seen that the outer end wall 7 is vertical but the inner end wall is at an angle against the vertical axis, whereby the upper part of the launder 3 is triangular in longitudinal section. The turbular lower part 9 of the launder is attached to the vertical upper part of the launder drain pipe 10. Through the lower part 11 of the launder drain pipe, which extends through the envelope of the tank, the froth is led off from the tank. The lower part of the discharge pipe forms an acute angle with the vertical wall of the tank, said angle being advantageously approximately 50°.

The juncture of the drain pipe 10 and the lower part 9 of the launder constitutes the second supporting point of the launder. The tubular lower part of the launder extends into the drain pipe 10 and the juncture is made in a suitable manner, e.g. by the aid of an O ring that so that the launder may be horizontally turned, if required, from its radial basic position through 90° in either direction about its points of support.

The adjustable, lockable and rotatable supporting structure 4 above the launder and the mobile juncture of the lower part 9 of the launder and of the drain pipe 10 constitute the supporting points of the launder, and these supports and junctures have been so constructed that in addition to the motion of the launder in the horizontal plane, the following adjustments may be carried out:

up and down adjustment with a view to bringing the top edges of all the launders to the same level without having to tilt the entire tank, adjustment with reference to the vertical axis so that the upper sides of the launders can be levelled horizontally without high accuracy in the mounting of the drain pipe being necessary.

The bottom of the tank of the flotation cell consists of two cones, and in the central area of the bottom has been placed the flotation mechanism. The launders have been placed in the upper part of the tank and their drain pipes on the portion of the tank's vertical walls, whereby neither the launders nor the drain pipes interfere with the operation of the flotation mechanism. The launders inside the tank serve advantageously as baffles preventing vortex formation and rotation of the entire body of slurry and froth.

The launders may be locked to be immovable or they may be horizontally turnable, whereby they operate as froth skimmers.

As has been observed in the foregoing, it is essential in the launders of the invention that they are situated inside the flotation cell tank and that the points of support of the launders are close to the tank wall. In the figures has been shown one alternative for the shape of the launders, but the launder may be, starting at its points of support, for instance bifurcated. Also in this case it may operate in fixed or movable mode.

The launders interior to the tank may also be mounted in tanks of rectangular cross-section in common use, and it is thus understood that the application is not merely limited to the circular tank depicted in the figure.

It is advantageous in certain instances to connect a vibrator to the launders to prevent accretions from forming and to ensure a continuous flow of the concentrate froth in the launder. Launders located outside the tank and immovably attached to the tank cannot be fitted with vibrators because they cause vibration of the entire cell.

We claim:

1. In combination, a flotation cell comprising a tank which has a wall, and apparatus for leading off froth from the tank, said apparatus comprising at least two launders placed inside the tank and each having a tubular lower part, means supporting the launders at respective support points close to the wall of the tank, and respective drain pipes connected to the tubular lower parts of the launders, the cell not including any member disposed within the tank above the launders and arranged to rotate in a horizontal plane in order to sweep froth into the launders.

2. A combination according to claim 1, wherein the tank is essentially cylindrical and the launders are disposed radially with reference to the tank.

3. A combination according to claim 2, wherein the launders are supported so as to be turnable in the horizontal plane through about 90° in either direction from their radial position.

4. A combination according to claim 3, wherein the support points of the launders are substantially equiangularly spaced about the tank and each launder extends at least halfway from the wall of the tank towards the center thereof.

5. A combination according to claim 1, wherein the wall of the tank is vertical and each drain pipe has an upper part that is vertical and a lower part that forms an acute angle with the wall of the tank and extends outside the envelope of the tank.

6. A combination according to claim 1, wherein the upper part of each launder is triangular in longitudinal section.

7. A combination according to claim 1, comprising a vibrator disposed in each launder.

8. A combination according to claim 1, further comprising means for driving the launders to turn about the respective axes of turning movement.

9. In combination, a flotation cell comprising a tank which has a wall, and apparatus for leading off froth from the tank, said apparatus comprising at least one launder placed inside the tank and having a tubular lower part, means supporting the launder at a support point close to the wall of the tank in such a manner that the launder is turnable in a horizontal plane about a vertical axis through its support point, and a drain pipe connected to the tubular lower part of the launder.

10. A combination according to claim 9, further comprising means for driving the launder to turn about its axis of turning movement.

* * * * *